United States Patent
Kampfer

[15] 3,689,876
[45] Sept. 5, 1972

[54] SCALE SELECTION CIRCUIT
[72] Inventor: John G. Kampfer, Dallas, Tex.
[73] Assignee: Texaco Inc., New York, N.Y.
[22] Filed: Aug. 19, 1969
[21] Appl. No.: 851,385

[52] U.S. Cl....340/18 P, 250/83.6 W, 340/15.5 TCD, 235/151.35, 328/48
[51] Int. Cl. ................................................G01v 1/16
[58] Field of Search.....................340/18 P, 15.5 TCD; 250/83.6W 235/151.35; 328/37, 72, 48, 106, 108, 109, 110; 307/218

[56] References Cited

UNITED STATES PATENTS

| | | | |
|---|---|---|---|
| 3,457,544 | 7/1969 | Miller et al. | 340/18 |
| 3,483,376 | 12/1969 | Locke et al. | 250/83.1 |
| 3,488,661 | 1/1970 | Tanguy | 346/1 |
| 3,494,187 | 2/1970 | Warren | 73/152 |
| 3,534,398 | 10/1970 | Wajpa | 328/48 |
| 3,064,237 | 11/1962 | Schubert | 328/37 |
| 3,493,715 | 2/1970 | Bigowsky | 328/48 |
| 3,369,183 | 2/1968 | Mestan | 328/48 |

Primary Examiner—Benjamin A. Borchelt
Assistant Examiner—N. Moskowitz
Attorney—K. E. Kavanagh and Thomas H. Whaley

[57] ABSTRACT

A remote controlled scale system which accepts control signals that are introduced over a long cable. A multiplicity of different circuits are connected to a corresponding number of AND gates. The AND gates are each provided with inputs from a series of binaries, which receive the control signals from the cable. The binaries have output circuits that are connected to the AND gates in such a way that for each of the possible combinations of the individual states of the binaries there will be only one of the AND gates that is provided with enable signals on all of its inputs. This permits remote selection and change to any one of the scales, as desired.

4 Claims, 1 Drawing Figure

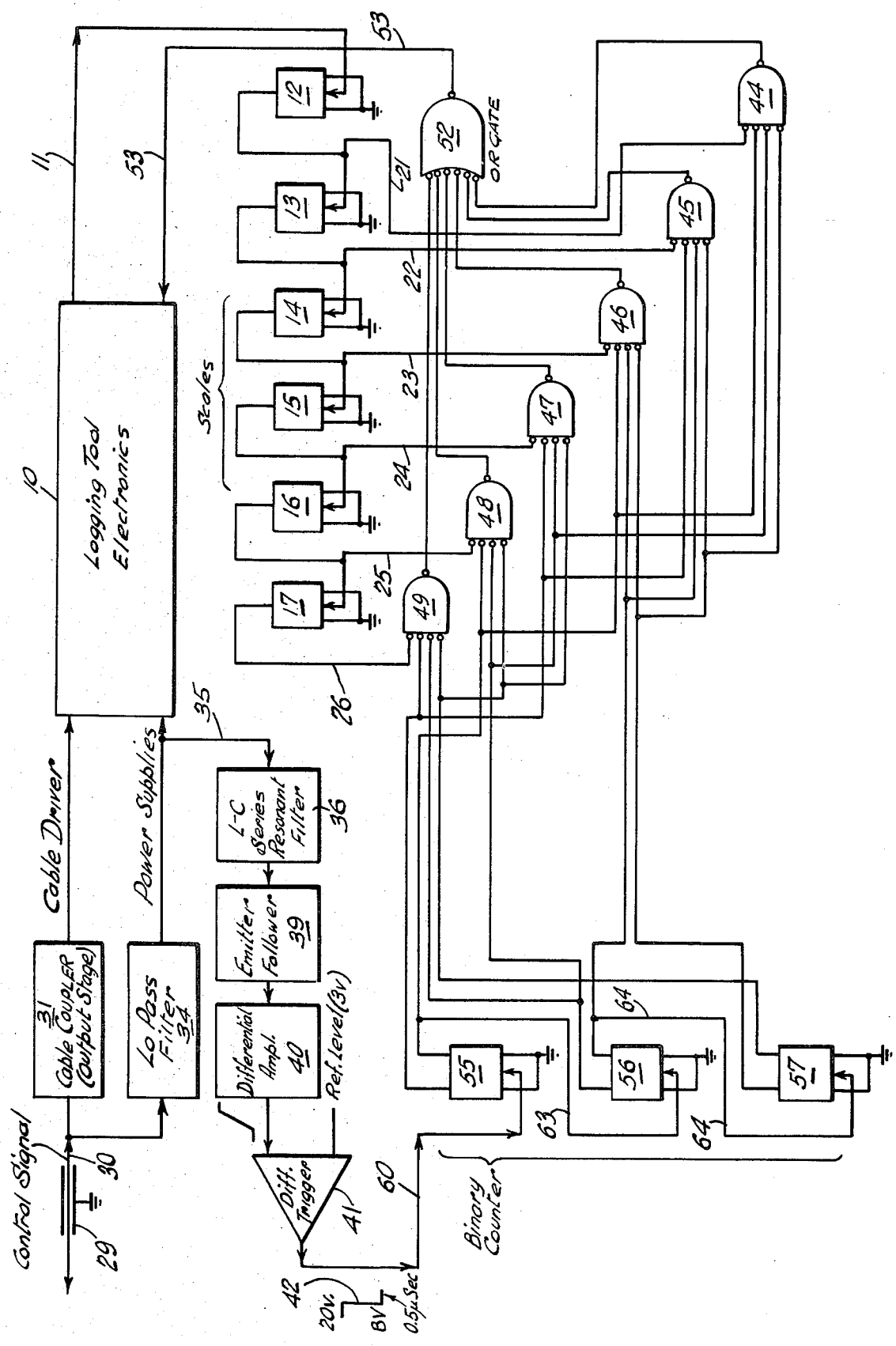

3,689,876

SCALE SELECTION CIRCUIT

BACKGROUND OF THE INVENTION

1. Field of the Invention

This invention concerns electronic control circuits, in general. More specifically, it relates to a circuit particularly useful with oil well logging tools. It involves remote control of a plurality of circuits by means of a series of low-frequency pulses applied to a logging cable.

2. Description of the Prior Art

In connection with oil well logging tools generally and particularly with respect to pulse counting tools, e.g. tools for radioactivity logging, there is a need for maintaining counting rates within a relatively narrow range for transmission to the surface. The need for scaling down a pulse rate has been recognized in the U.S. Patent to Herzog, No. 2,666,146. However, the scale employed in the system of that patent would be predetermined and could not be changed from outside the logging tool.

Consequently, it is an object of this invention to provide an electronic system whereby a given scale setting may be determined and changed as desired, by simple pulse signals from the surface. In this manner any particular scale setting may be made downhole as controlled from the surface, and the equipment is compact and reliable.

SUMMARY OF THE INVENTION

Briefly, the invention is applicable to a variable pulse rate output device which has a plurality of counting scales. The invention relates to a scale selection circuit that comprises means for connecting each of said scales to a separate gate. It also comprises means for selectively controlling said gates to open only one at a time.

Again briefly, the invention relates to a combination with a logging tool that has a long cable connected thereto. The tool includes a plurality of counting scales therein. The improvement comprises a plurality of AND gates, each having a plurality of inputs, and first circuit means for connecting each of said scales to an input of a corresponding one of said AND gates. It also comprises a plurality of binaries connected in series and each having a pair of outputs, and second circuit means for connecting said binary outputs to additional inputs of said AND gates in order to provide predetermined combinations of enabling and inhibiting signals. In addition, it comprises third circuit means for connecting the first of said binaries to said cable in order to apply control signals to activate a predetermined one of said scales.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawings, wherein:

The FIGURE of drawings in a schematic circuit diagram illustrating a scale selection system for logging tools.

DESCRIPTION OF THE PREFERRED EMBODIMENT

Referring to the FIGURE of drawings, it will be noted that the illustrated modification of the invention is particularly applicable to a logging tool for oil well logging, where a long cable is employed for lowering the tool down into the well. Furthermore, the particular application relates to logging of the kind that produces signals in the nature of pulses or counts which relate to a characteristic of the formation being measured, e.g. some type of radioactivity logging or the like. The equipment for such logging is not specifically illustrated in detail but is merely indicated by the caption "Logging Tool Electronics" on a block 10 of the drawing.

The output signals of the logging equipment are in the form of pulses to be counted, which may occur at varying rates. Such pulses are carried over a circuit connection 11 from the tool electronics 10. This circuit 11 goes to the input of a flip-flop scaling binary 12. It is the first of a series of similar scaling binaries 12–17.

There are output connections from each of the stages of the series of scales 12–17, i.e. circuit connections 21–26. These provide separate scales for the counting rate. Consequently, the number of output signals per unit time may be selectively reduced as desired. Each scale reduces the output counting rate by a factor of 2. It will be appreciated that while six different scales have been shown, there could be a wider range, if desired, by adding additional scaling binaries in the series.

The elements illustrated in the drawing are all located within a logging tool (not shown). The tool will be lowered downhole at the end of a cable 29 which is schematically illustrated. The cable 29 has a grounded sheath as indicated. Also, there is a coaxial conductor 30 that is connected to a so-called "cable coupler" 31. The latter contains electronic circuitry to connect the output of the logging tool to the cable 29 for transmittal to the surface. In addition, there is also connected to the conductor 30 a low-pass filter 34 for power supply connections to the logging tool electronics 10. It will be appreciated that this arrangement may involve a very long cable, e.g. about 20,000 feet in length.

There is also an output connection from the filter 34 over a circuit connection 35 to the input side of a filter 36 that is tuned to a particular frequency. This filter 36 is preferably an L-C series resonant type having an appropriate frequency, e.g. 1,600 or 3,200 cycles per second. This is done in order to pass only the control signals for the scale setting system.

Following the filter 36 there is an emitter-follower 39 that feeds into a differential amplifier 40, which in turn feeds into a differential trigger 41. The a.c. control signals that pass through the filter 36 are transformed to d.c. voltages, the levels of which are linearly related to the amplitudes of the control signals. The rise time of the d.c. level at this transformation is about 50 milliseconds.

In the differential trigger 41 there is approximately a gain of 100,000 which forces the output to have a 0.5 microsecond rise time duration. However, for the purposes of the binary counter which follows, this is a negative going signal. Specifically, it is a change from 20 volts to 13 volts, as is indicated by a wave form symbol 42. Such negative going, steep rise time signal is triggered whenever the input from the differential trigger 41 exceeds a predetermined level, i.e. 3 volts in this case.

In carrying out the selection of a particular scale, i.e. choosing one of the scale circuit connections 21–26, there are a number of AND gates 44–49 that each have one of the inputs thereof connected to a corresponding one of the connections 21–26 respectively. All of these AND gates 44–49 have output connections that lead into an OR gate 52. The single output from the OR gate 52 goes to the tool electronics 10 over a circuit connection 53. It will be appreciated that this may include a pulse shaping multivibrator (not shown) for regenerating appropriate signals to be transmitted up the cable.

The selection of a particular one of the scale outputs is made by determining which one of the AND gates 44–49 is to be open at a given time. Or, in other words, it is made by determining which AND gate is to have enabling signals on all of its inputs that are in addition to the input for the scale selection circuit.

The foregoing additional inputs to each of the AND gates 44–49 are three in number and are connected in predetermined combinations to the outputs of three binaries or flip-flops 55, 56 and 57. It will be observed that these three binaries are connected in series and are designated by a caption "Binary Counter". The first, i.e. flip-flop 55, has its input connected to a circuit connection 60 that leads from the output of the differential trigger 41. Consequently, there will be a pulse that actuates the "Binary Counter" (flip-flops 55–57) each time there is a control signal having the above-mentioned frequency on the conductor 30 of the cable 29.

It will be clear to anyone skilled in the art that the Binary Counter, i.e. binaries 55, 56 and 57, will act in a well known manner at the receipt of input pulses. Thus, each flip-flop will be switched over by a first pulse and then switched back to the first state by a second pulse. At the same time and with the return, each flip-flop will simultaneously provide an output signal. Therefore, the first input pulse will switch flip-flop 55 and no other action will take place. Then, when a second pulse arrives the flip-flop 55 will be returned, or switched back to its first state. This will simultaneously provide an output signal on a circuit connection 63 that goes to the input of the next flip-flop 56. Consequently, flip-flop 56 will be switched over. Then the action will continue in a similar manner so that a third pulse arrival will only switch the flip-flop 55 once more. A fourth pulse arrival will return flip-flop 55 again and also simultaneously return flip-flop 56. The flip-flop 56 will switch flip-flop 57 because of the simultaneous output signal from the flip-flop as it is returned. The latter signal goes over a circuit connection 64.

It will be appreciated that the flip-flops each have two stable states which may be designated "on" or "off". Therefore, the three flip-flops 55, 56 and 57 may exist in any one of eight different on-off combinations. This fact is made use of to provide "enable" signals, as desired, at particular ones of the above described (three) "additional inputs" for each of the AND gates 44–49.

It will be understood by one skilled in the art that each flip-flop 55, 56 or 57 has two outputs that are alternately at a given signal level. Consequently, one such level may constitute the foregoing "enable" signal while the other constitutes the converse, or an "inhibit" signal. Therefore, if such other signal level (inhibit signal) exists at any one of the inputs to any of the AND gates 44–49, such gate will remain closed.

In view of the foregoing, it will be understood that by having the connections that are illustrated, six of the eight different combinations mentioned above will provide for one and only one of the AND gates 44–49 to have "enable" signals on all three of the "additional inputs" at the same time. Consequently, a predetermined AND gate will be opened by providing a particular number of control signals from the surface. The two unused combinations of outputs are arranged to be adjacent to one another, with respect to the sequence of eight control signals in order to have a reference point for determining which of the other six combinations exist downhole at any given time.

It will be appreciated by one skilled in the art that various circuit elements might be employed in the illustrated system. For example, there are known circuits which would be appropriate for such elements as the flip-flops 55–57 and the "scale" binaries 12–17. Such circuits are published by manufacturers of electronic circuits, e.g. Motorola Inc. and its subsidiaries. In like manner, there are known circuits available, as appropriate, for other elements such as the emitter-follower 39, the differential amplifier 40 and the differential trigger 41. Furthermore, the AND gates 44–49 as well as the OR gate 52 may be made up of known circuits, which like the flip-flops are available from manufacturers of integrated circuits.

While the foregoing description of the invention has been set forth in considerable detail in accordance with the applicable statutes, this is not to be taken as in any way limiting the invention but merely as being descriptive thereof.

I claim:

1. In a variable pulse rate output device having a plurality of counting scales, a scale selection circuit comprising
    means for connecting each of said scales to a separate gate,
    a plurality of binaries connected in series,
    said binaries each having a pair of outputs, and
    means for connecting said binaries outputs to said gates in predetermined combinations in order to open one gate at a time.

2. In combination with a logging tool having a long cable connected thereto, said tool including a plurality of counting scales therein, the improvement comprising:
    a plurality of AND gates each having a plurality of inputs,
    first circuit means for connecting each of said scales to an input of a corresponding one of said AND gates,
    a plurality of binaries connected in series and each having a pair of outputs
    second circuit means for connecting said binary outputs to additional inputs of said AND gates in order to provide predetermined combinations of enabling and inhibiting signals, and third circuit means for connecting the first of said binaries to said cable in order to apply control signals to activate a predetermined one of said scales.

3. The invention according to claim 2 wherein said third circuit means comprises a selective filter and means for shaping said control signals before application to said binaries.

4. In combination with a logging tool having a long cable connected thereto, said tool including a variable pulse rate output device having a plurality of counting scales comprising a plurality of binaries in series for successively reducing the counting rate by factors of two, the improvement comprising:

a plurality of AND gates each having a plurality of inputs, first circuit means for connecting each of said scales to an input of a corresponding one of said AND gates, a second plurality of binaries connected in series and each having a pair of outputs, second circuit means for connecting said second binary outputs to additional inputs of said AND gates in order to provide predetermined combinations of enabling and inhibiting signals, and third circuit means for connecting the first of said second binaries to said cable in order to apply control signals to activate a predetermined one of said scales, said third circuit means comprising a selective filter and means for shaping said control signals before application to said second binaries.

* * * * *